United States Patent [19]
Price et al.

[11] 3,793,896
[45] Feb. 26, 1974

[54] INCREMENTAL LINEAR POSITIONING APPARATUS

[75] Inventors: Robert B. Price, Delanson; Richard N. Hosterman, Elnora, both of N.Y.

[73] Assignee: Numicon, Inc., Delanson, N.Y.

[22] Filed: Sept. 6, 1972

[21] Appl. No.: 286,769

[52] U.S. Cl............................... 74/89.15, 74/459
[51] Int. Cl............................................ F16h 27/02
[58] Field of Search................ 74/459, 89.15, 424.8

[56] References Cited
UNITED STATES PATENTS

| | | | |
|---|---|---|---|
| 3,404,581 | 10/1968 | Kraus | 74/424.8 |
| 3,575,378 | 4/1971 | Fawkes | 74/89.15 |
| 2,915,913 | 12/1959 | Melyneux | 74/424.8 |
| 2,090,330 | 8/1937 | Jones | 74/424.8 |
| 3,642,353 | 2/1972 | Field | 74/89.15 |
| 3,656,358 | 4/1972 | Knopp | 74/459 |

Primary Examiner—Leonard H. Gerin
Assistant Examiner—Wesley S. Ratliff, Jr.
Attorney, Agent, or Firm—Leonard H. King

[57] ABSTRACT

For use in the machine tool arts, an attachment is provided permitting the linear positioning in very small increments of either a workpiece or a machine element. A generally tubular outer housing supports a stepping motor having an output shaft that is coupled to an internally positioned motion changing device such as a ball-nut assembly. The rotary movement of the stepping motor is converted into small axial movements of the lead screw by the ball-nut assembly. Means within the housing constrain the output shaft of the ball-nut assembly to linear movement.

The aforementioned abstract is neither intended to define the invention of the application which, of course, is measured by the claims, nor is it intended to be limiting as to the scope of the invention in any way.

14 Claims, 6 Drawing Figures

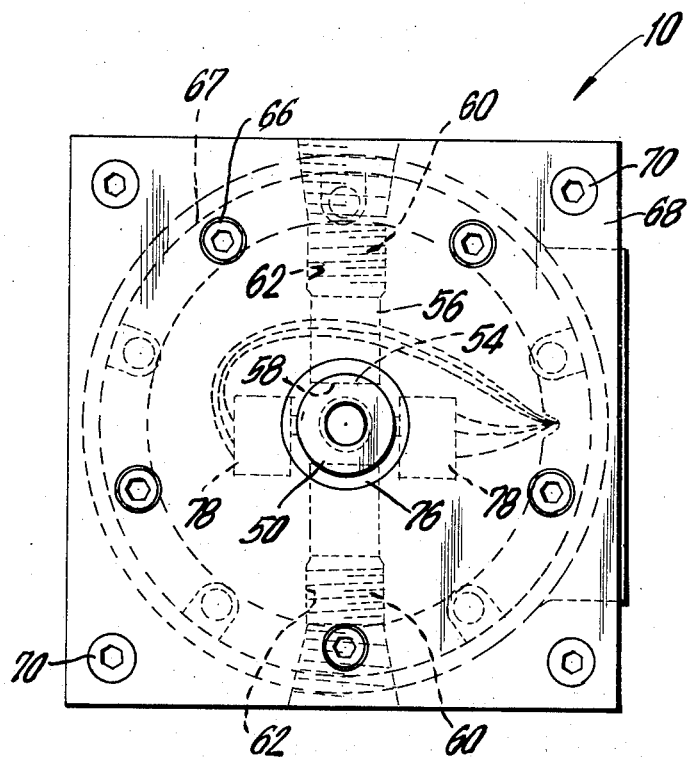
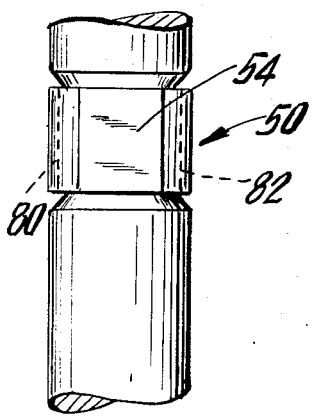
FIG. 4
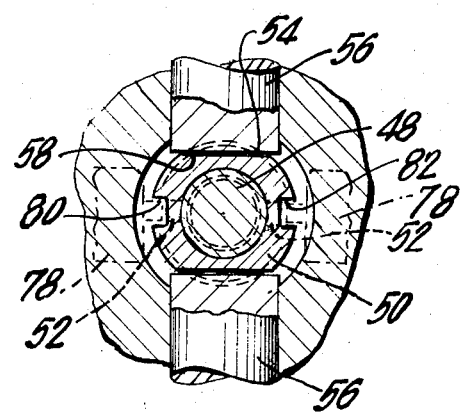
FIG. 3
FIG. 2
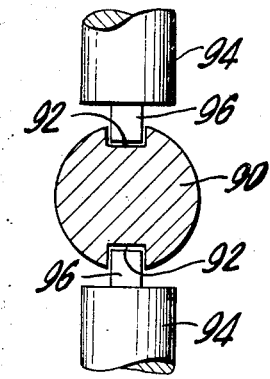
FIG. 5
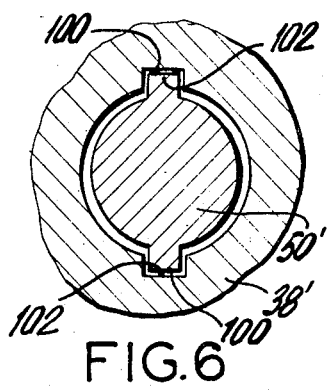
FIG. 6

INCREMENTAL LINEAR POSITIONING APPARATUS

BACKGROUND OF THE INVENTION

1. Field of the Invention:

This invention relates generally to the automatic machine and tool arts and, more particularly, to an improved, self-contained attachment for providing small linear increments of movement that may be imparted to either a workpiece or a machine element, at a rate which permits rapid adjustment and control.

2. Description of the Prior Art:

In many manufacturing or production situations, particularly where the workpiece must be machined to extremely close tolerances or where a machine element must be precisely positioned, it is necessary to precisely control the movement of either the workpiece or the machine element. One common example is in the grinding of a workpiece. In the past, relatively complex mechanisms that are difficult to manufacture and difficult to maintain have been suggested for providing small incremental linear motions.

SUMMARY OF THE INVENTION

By way of contrast, the present invention provides a self-contained attachment that will assure accurate linear motion in very small increments, of either a workpiece or a machine element. In its broadest aspect, the present invention provides a generally tubular outer housing on which a stepping motor is mounted. The stepping motor has an output shaft that is capable of being electricaly positioned to a large number of discrete angular positions. One such motor that may be used with the present invention is adapted to make 500 steps per revolution and, together with a special solid state elctronic drive, may be caused to move in 1,000 discrete steps per revolution. A ball-nut assembly may be utilized for changing the rotary or angular motion of the stepping motor output shaft to liner motion. The ball-nut assembly is coupled directly to the output shaft of the stepping motor and is provided with a screw having a lead of 0.050 inches, thus producing a linear output motion of 50 micro inches per step. The unit, as will be described more fully hereinafter, is capable of stepping at rates in excess of 250 steps per second. The ball-nut assembly is contained within the outer housing and the lead screw is constrained to move only along a linear path by means of specially constructed, adjustable, guide pins extending through the housing. Ball bearings are used to rotatably support the ball-nut assembly with respect to the outer housing so as to minimize frictional loads.

Accordingly, it is an object of the present invention to provide improved means for producing small linear incremental movements of a shaft.

It is another object of the present invention that the apparatus descrived hereinabove be self-contained and readily adaptable to existing machinery.

Still another object of the present invention is to provide apparatus, as described above, that may be used to control either the workpiece of the machine tool.

These and other objects, features and advantages of the invention will, in part, be pointed out with particularity and will, in part, become obvious from the following more detailed description of the invention taken in conjunction with the accompanying drawing, which forms an integral part thereof.

BRIEF DESCRIPTION OF THE DRAWING

In the various figures of the drawing, like reference characters designate like parts.

FIG. 2 is an elevational view illustrating the right hand end of the apparatus shown in FIG. 1;

FIG. 3 is a fragmentary, transverse, elevational view in section taken along line 3—3 of FIG. 1;

FIG. 4 is a fragmentary, plan view illustrating the relationship of limit switch means and the lead screw used in the present invention;

FIG. 5 is a fragmentary, transverse, elevational view in section illustrating an alternative construction of one portion of the present invention; and FIG. 6 is a fragmentary, transverse, elevational view in section illustrating still another alternative construction of one portion of this invention.

DESCRIPTION OF THE PREFERRED EMBODIMENT

Figure 1:
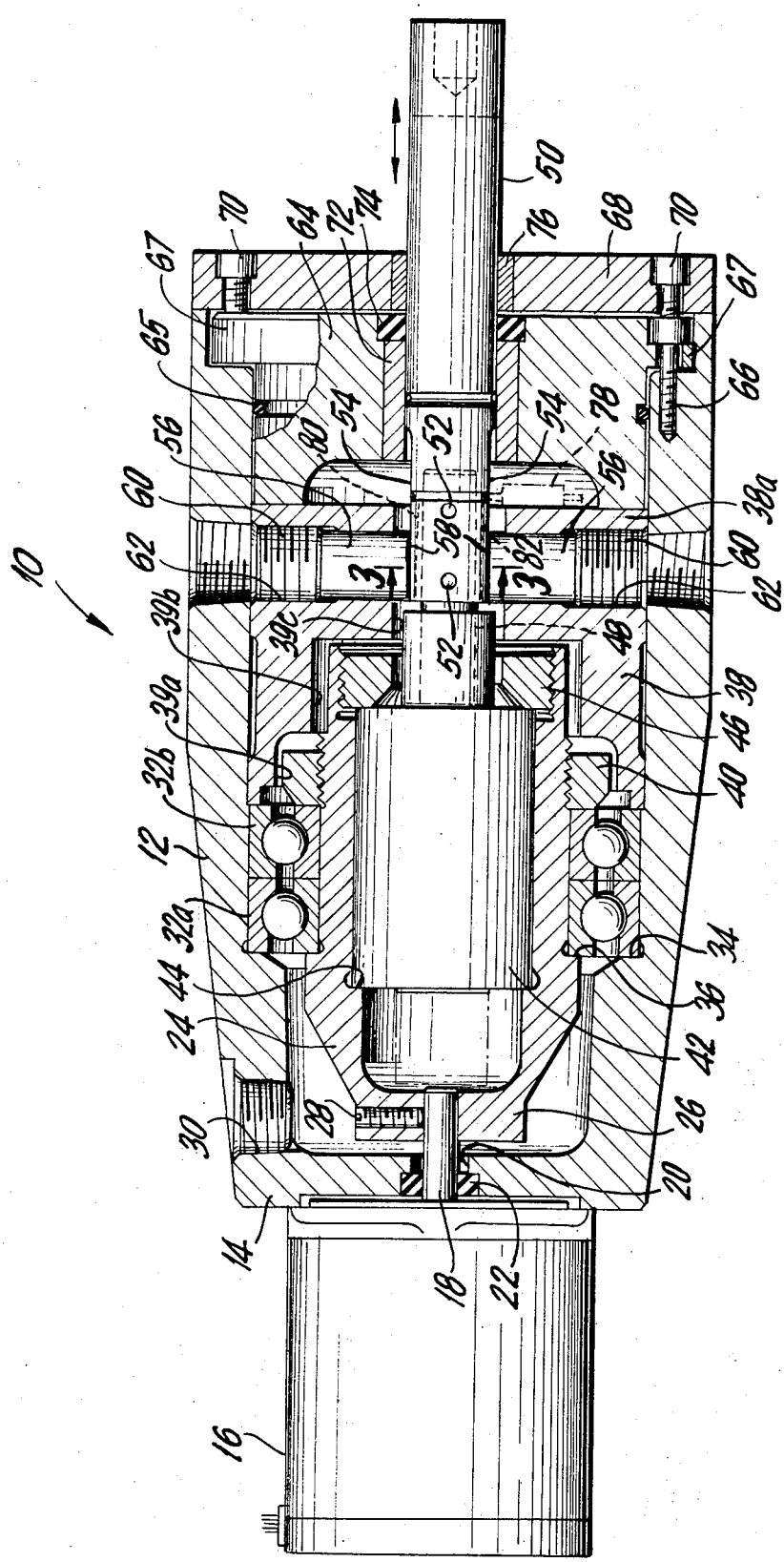
FIG. 1 is a longitudinal view, partially in section, illustrating one embodiment of the present invention.

The incremental, linear positioning assembly 10 comprising the present invention is illustrated in longitudinal section in FIG. 1 and is seen to comprise a generally tubular outer housing 12 having a transverse end wall 14. A reversible stepping motor 16, such as manufactured by Superior Electric Company under Catalog No. LS-50, is mounted on the end wall 14 and through a seal 22.

There is also provided an inner, generally tubular, housing 24 having an end wall 26 that is in the embodiment illustrated, in closely spaced proximity to the end wall 14. The output shaft 18 of the stepping motor 16 is rigidly secured to the inner housing 24 by means of a set screw 28 that passes radially through the end wall 26. An opening 30 formed in the outer housing 12 provides access means for the set screw 28. The inner housing 24 is rotatably supported, relative to the outer housing 12, by means of a pair of angular contact ball bearings 32a and 32b which are mounted and preloaded in such a way as to permit only rotational movement of the inner housing 24. It will be seen in FIG. 1 that the outer race of the ball bearing 32a abuts a transverse shoulder 34 formed on the inside surface of the outer housing 12 while the inner race of the same ball bearing 32a abuts a transverse shoulder 36 formed on the outer surface of the inner housing 24. The outer race of the other ball bearing 32b is clamped by means of the annular end face of a ring-like member 38 having a transverse end wall 38a and successively smaller concentric bores 39a, 39b and 39c. The inner race of the other ball bearing is clamped by means of a nut 40 that is threadably secured to the inner housing 24, the nut 40 being telescoped within the bore 39a.

A ball-nut assembly generally designated by the reference character 42 defines one form of motion changing means and is mounted within the tubular inner housing 24 in abutment with a transverse shoulder 44 formed on the inside surface thereof. A nut 46 threadably secured within the inner housing 24 clamps the other end of the ball-nut assembly 42. The nut 46 and the mating threaded end of the ball-nut assembly 42 are telescoped within the bore 39b. Thus, the inner housing 24, together with the ball-nut assembly 42, are adapted to rotate relative to the outer housing 12 by virtue of its connection with the stepping motor 16.

Since the housing of the ball-nut assembly 42 is constrained so as to rotate only, the lead screw 48 thereof must be constrained to move only axially. The lead screw passes through the bore 39c in the ring-like member 38. An output shaft 50, adapted to move either the workpiece or the tool (not shown) on its free end, is secured to the lead screw 48 by means of radially extending pins 52. In order to limit the output shaft 50 to linear movement only, anti-rotation means are provided.

In the embodiment illustrated by FIG. 1, the antirotation means comprises, in part, a pair of axially extending, diametrically opposed flats 54 formed on the outer surface of the output shaft 50. A pair of radially extending guide pins 56 having flat inner ends 58 and threaded outer ends 60 are positioned so as to be in very close proximity to the flats 54 formed on the output shaft 50. Preferably, there is a gap in the order of 50–75th inches between the inner ends of the pins 56 and the flats 54. The pins 56 are inserted through threaded holes 62 that are formed in the outer housing 12 and through the clamp member 38 in order to provide precisely adjustable relative positioning and the lead screw 48, are thusly arranged to slide axially relative to the inner ends 58 of the guide pins 56 but are positively constrained from rotating. It should be noted that while two diametrically opposed flats 54 and pins 56 are illustrated, and this is the preferred arrangement, the same anti-rotation function may also be accomplished with a single pin and a single flat.

A second clamp 64 having annular seal means 65 acting on the inside surface of the outer housing 12, bears against and thereby retains the ring 38. Fasteners 66 secure a flange 67 of the clamp 64 to the outer housing 12. A cover plate 68 is then fastened to the clamp 64 by means of fasteners 70. The output shaft 50 passes through a guide bushing 72 and an oil seal 74 in the clamp 64 and then through a second guide bushing 76 in the cover plate 68.

In order to monitor the axial position of the output shaft 50, a pair of snap action type switches 78 are mounted on the transverse end wall 38a of the ring 38 proximate the bore 39c. The switches 78 are triggered by two axially spaced apart grooves 80 and 82 that are formed on the surface of the output shaft 50. For purposes of clarity, the switches 78 are shown 90° out of position in FIG. 1 but in their proper orientation in FIGS. 2, 3 and 4.

The apparatus comprising the present invention is an electromechanical device which has the capability of moving the output shaft 50 either in or out in response to polarized electrical signals. The incremental motion generated is specifically designed to produce movements in the 50 micro inch range. The prime mover is a reversible electrical stepping motor 16 which can be positioned in any one of 1,000 different positions. Through conventional electrical circuitry, it is possible to move the armature of the stepping motor 16 halfway between its 500 naturally selected positions thereby increasing the angular resolution obtained. The lead of the ball screw 48 is exceptionally fine being in the order of 20 threads per inch in order to produce the lead of approximately 0.050 inches per revolution of the stepping motor output shaft 18. By dividing the lead of the ball screw 48 by the total number of possible steps of the output shaft 18 of the stepping motor 16, an output motion of 50 micro inches is obtained. The unit is capable of stepping at rates in excess of 250 steps per second.

An alternative structure for limiting the lead screw to axial movement is shown in FIG. 5. In the second embodiment, the lead screw 90 is provided with a pair of diametrically opposed, axially extending grooves 92. A pair of radially extending guide pins 94 that are suitably secured within the outer housing of the apparatus, for example in the same manner as described hereinabove, are each provided with reduced diameter portions 96 that are arranged to engage the grooves 92. While the second embodiment of the invention eliminates the adjustment feature and might be more costly to manufacture than the first embodiment, the tangential engagement between the reduced diameter portions 96 and the side walls of the respective grooves 92 provides minimal frictional loads. If necessary, all frictional contact can be eliminated. It should be noted, however, that the flat inner ends 58 of the hardened guide pins 56 shown in FIG. 1 may be located very precisely relative to but not normally in contact with the flats 54 on the output shaft 50 by means of the threads 60 and 62.

Still other means for preventing rotation of the lead screw is shown in FIG. 6. In this embodiment at least one and preferably two axially extending, diametrically opposed ribs 100 are formed on the outer surface of the output shaft 50'. Mating grooves 102 in the ring-like member 38' receive the ribs 100. As in the previous embodiments only one rib 100 and one groove 102 need be used. It should also be noted that ribs 100 may actually be keys that are integrally secured to the output shaft 50'. It should be further noted that the ribs 100 may be applied to the ring-like member 38' and the grooves 102 to the output shaft 50'. This embodiment, of course, eliminates the adjustable feature of the first embodiment.

There has been disclosed heretofore the best embodiment of the invention presently contemplated. However, it is to be understood that various changes and modifications may be made thereto without departing from the spirit of the invention.

What we claim as new and desire to secure by Letters Patent is:

1. An incremental, linear positioning assembly for use in combination with a machine tool or the like, said feed assembly comprising:
   a. a generally tubular outer housing;
   b. a stepping motor affixed relative to said housing and having an output shaft positioned within said housing;
   c. a generally tubular inner housing rigidly secured to said output shaft of said stepping motor;
   d. means rotatably journaling said inner housing with respect to said outer housing;
   e. a motion changing assembly positioned within and coupled to said tubular inner housing, said motion changing assembly including a rotatable member and an axially moveable output member therein for converting the rotary movement of said output shaft of said stepping motor to linear movement;
   f. means for clamping said rotatable member of said motion changing assembly to said inner housing for rotation together therewith;
   g. anti-rotation means for limiting said axially moveable output member of said motion changing assembly to linear movement; and h. switch means within said outer housing, said switch means being responsive to the linear movement of said axially moveable output member of said motion changing assembly.

2. The positioning assembly in accordance with claim 1 wherein said anti-rotation means comprises at least one axially extending flat surface formed on said axially moveable output member of said motion changing assembly and at least one guide pin extending inwardly of said outer housing, the inner end of said guide pin being in opposition to said flat surface.

3. The positioning assembly in accordance with claim 2 wherein the inner end of said guide pin is flat.

4. The positioning assembly in accordance with claim 2 wherein said guide pin is radially adjustable with respect to said flat surface.

5. The positioning assembly in accordance with claim 1 wherein said anti-rotation means comprises a pair of axially extending surfaces formed on said axially moveable output member of said motion changing assembly and a pair of guide pins extending inwardly of said outer housing, the inner ends of said guide pins being in opposition to said flat surfaces.

6. The positioning assembly in accordance with claim 5 wherein the inner ends of said guide pins are flat.

7. The positioning assembly in accordance with claim 5 wherein said guide pins are radially adjustable with respect to said flats.

8. The positioning assembly in accordance with claim 5 wherein said flat surfaces are diametrically opposed to each other.

9. The positioning assembly in accordance with claim 1 wherein said anti-rotation means comprises at least one axially extending groove formed in said axially moveable output member of said motion changing assembly and at least one guide pin extending inwardly of said outer housing, the inner end of said guide pin being positioned within said groove.

10. The positioning assembly in accordance with claim 9 wherein there are two of said grooves and two of said pins.

11. The positioning assembly in accordance with claim 10 wherein said grooves are diametrically opposed to each other.

12. The positioning assembly in accordance with claim 1 wherein said stepping motor is capable of approximately 1,000 steps per revolution and the said output member of said motion changing assembly has a lead of approximately 0.050 inches thereby providing and output motion of approximately 50 micro inches per step.

13. The positioning assembly in accordance with claim 1 wherein said stepping motor is reversible.

14. The positioning assembly in accordance with claim 1 wherein said output shaft of said stepping motor moves at least 250 steps per second.

* * * * *